July 22, 1952   R. W. KEENE   2,603,936
SNAP LOCK PICKUP FINGER FOR HARVESTER REELS
Filed July 3, 1950

INVENTOR
Ralph W. Keene

BY
ATTORNEYS

Patented July 22, 1952

2,603,936

UNITED STATES PATENT OFFICE 2,603,936

SNAP LOCK PICKUP FINGER FOR HARVESTER REELS

Ralph W. Keene, Stockton, Calif.

Application July 3, 1950, Serial No. 171,853

6 Claims. (Cl. 56—400)

This invention pertains in general to an improved pick-up finger for harvester reels.

It is a prime object of this invention to provide a novel, detachable pick-up finger for harvester reels; the finger being snap-locked to engage the same on the bat-bar, and quick-detachable from the latter.

Another important object of the invention is to provide a pick-up finger which can be engaged on a bat-bar of a harvester reel, without the use of any special tools and with no more than a simple manipulation of snap-together parts of the pick-up finger; the same being formed from a single length of spring steel wire of heavy gauge.

A further object of the invention is to provide a pick-up finger, as above, which includes a downwardly opening, initially open, U-shaped yoke adapted to straddle the bat-bar from above; one shank of the yoke merging at its lower end with a transverse axis coil spring, and the lower end of the other shank being formed with a catch finger adapted to snap-hook in the coil spring after the yoke is straddled over a bat-bar.

A still further object of the invention is to provide a pick-up finger which includes a novel arrangement for preventing lateral displacement of the pick-up fingers along the corresponding bat-bar; this arrangement being downwardly opening notches in the bat-bar into which the transverse axis coil springs of the corresponding pick-up fingers engage from below.

It is also an object of the invention to provide a snap-lock pick-up finger for harvester reels which is designed for ease and economy of manufacture.

Still another object of the invention is to provide a practical and reliable snap-lock pick-up finger for harvester reels, and yet one which will be exceedingly effective for the purpose for which it is designed.

These objects are accomplished by means of such structure and relative arrangement of parts as will fully appear by a perusal of the following specification and claims.

Figure 1:
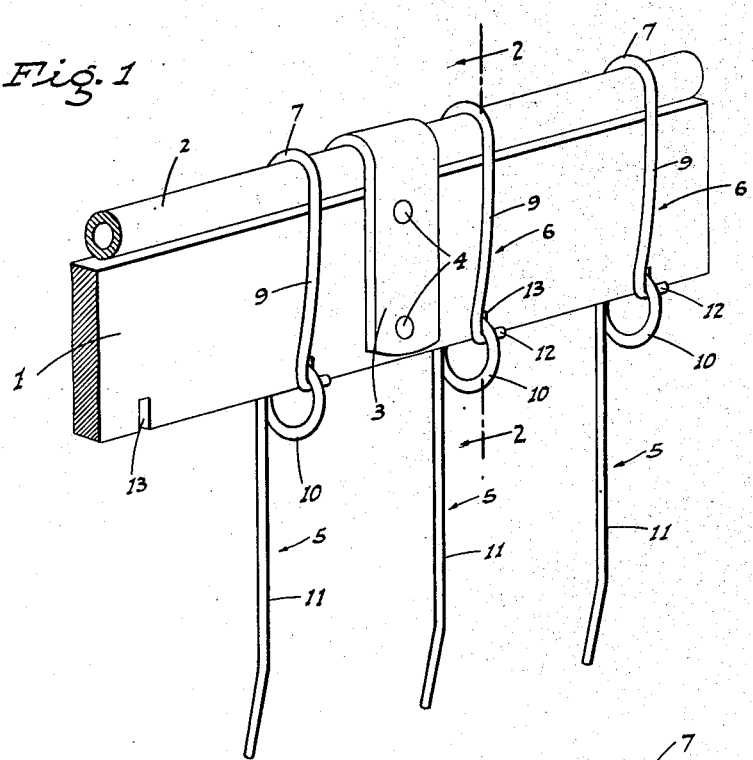
Fig. 1 is a fragmentary perspective view of a pick-up reel bat-bar showing a plurality of the snap-lock pick-up fingers as mounted thereon.

Referring now more particularly to the characters of reference on the drawings, the snap-lock pick-up finger is adapted for use on a harvester reel of the type which includes circumferentially spaced bat-bars extending from end to end of the reel; one of such bat-bars being indicated at 1.

The bat-bar 1 includes, along its upper edge, a metal rod 2 secured in place at circumferentially spaced points by securing clips, one of such clips being shown at 3. Each securing clip 3 is U-shaped and straddles the rod 2 and bat-bar 1, being riveted to the latter, as at 4.

The bat-bar 1, including the metal rod 2, is fitted, at longitudinally spaced points, with snap-lock but quick-detachable pick-up fingers, indicated generally at 5.

These pick-up fingers 5 embody the present invention, and as each finger is identical, a description of one will suffice.

Each pick-up finger 5 is formed with a single length of heavy-gauge spring steel wire and comprises a clamping yoke, indicated generally at 6, which yoke is of elongated, inverted U-shape, and comprising, at the top, a half loop 7 of an inside diameter no greater than the outside diameter of the metal rod 2. The half loop 7 connects the upper ends of shanks 8 and 9 which initially extend downwardly in slightly diverging relation.

At its lower end the shank 8 merges with a transverse axis, single loop coil spring 10, and the other end of said spring merges with a depending spring tine 11 of substantial length.

At its lower end the shank 9 is formed with a laterally projecting hook or catch finger 12 which is normally free, and slightly ahead, of the coil spring 10.

The above described spring finger is snap-locked on the bat-bar 1 in the following manner:

Firstly, the initially open clamping yoke 6 is engaged over the bat-bar 1 with the half loop 7 spanning over the metal rod in close engagement therewith.

Figure 2:
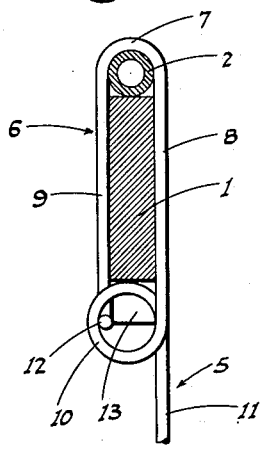
Fig. 2 is a cross section on line 2—2 of Fig. 1.
Figure 3:
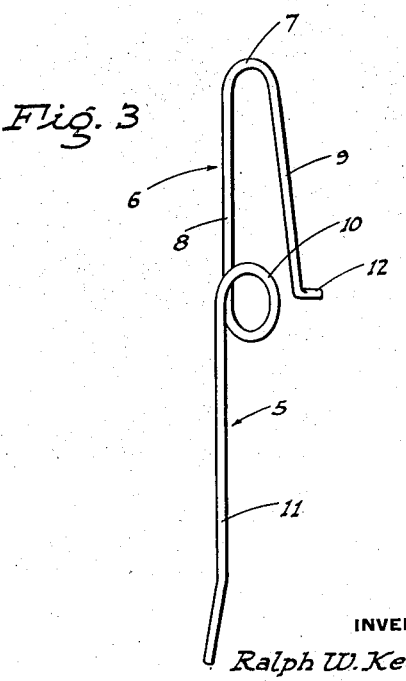
Fig. 3 is a perspective view of one of the pick-up fingers, detached.

With the clamping yoke 6 thus straddling the bat-bar 1, the transverse axis, coil spring 10 is engaged, at its upper portion, through a downwardly opening notch 13 in the lower edge portion of the bat-bar 1. Thereafter, the shank 9 is manipulated laterally and inwardly, placing it under tension, and so that the hook or catch finger 12 may be snap-locked through the coil spring 10, in the manner clearly shown in Figs. 1 and 2.

With the hook or catch finger 12 so snap-locked with the coil spring 10, the half loop 7 frictionally bites the metal rod 2, and the shanks 8 and 9 lie in close contact with opposite faces of the bat-bar 1. See Fig. 2.

As so clamped in place, the pick-up finger is effectively maintained in proper position on the bat-bar 1, with the spring tine 11 projecting downwardly therefrom. The pick-up finger is also held against displacement along the bat-bar 1 by reason of the engagement of the coil spring 10 in the related notch 13. This latter feature is also important for the reason that it permits the hook or catch finger to lie so that it does not extend any substantial distance below the lower edge of the bat-bar 1, and which would otherwise permit such finger to pick up foliage during operation of the reel.

To release each pick-up finger 5 from the bat-bar 1 requires only disengagement of the hook or catch finger 12 from the coil spring 10, whence the shanks 8 and 9 may be pulled apart and the clamping yoke 6 slipped off said bat-bar.

The described pick-up finger is very practical and reliable, for the reason that it can be readily snap-locked on a bat-bar, or quick-detached therefrom; yet when in place being firmly and effectively maintained in place.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A snap-lock, quick-detachable pick-up finger for a harvester reel bat-bar, comprising a single length of spring steel wire bent to form an inverted U-shaped clamping yoke, said yoke including opposed shanks connected at the top by a half loop, a transverse-axis coil spring on the lower end of one shank, there being a spring tine depending from said coil spring at the end thereof opposite said one shank, and a hook on the lower end of the other shank adapted to snap-engage through said coil spring.

2. A snap-lock, quick-detachable pick-up finger for a harvester reel bat-bar, comprising a single length of spring steel wire bent to form an inverted U-shaped clamping yoke, said yoke including opposed shanks connected at the top by a half loop, a transverse-axis coil spring on the lower end of one shank, there being a spring tine depending from said coil spring at the end thereof opposite said one shank, and a hook on the lower end of the other shank adapted to snap-engage through said coil spring; the shanks of the inverted U-shaped clamping yoke initially diverging in a downward direction.

3. In combination with a bat-bar of a harvester reel, a snap-locked but quick-detachable pick-up finger comprising a single length of spring steel wire, an inverted U-shaped clamping yoke including opposed shanks connected at their upper ends by a half loop, said clamping yoke straddling the bat-bar from above, a transverse-axis coil spring on the lower end of one shank extending beneath the bat bar, a hook on the lower end of the opposite shank snap-engaged through said coil spring from one side thereof, and a spring tine depending from the end of the coil spring opposite said one shank.

4. A combination, as in claim 3, in which the bat-bar is formed, in its lower edge portion, with a downwardly opening notch, and the coil spring projecting at the top into and through said notch; the hook engaging through a portion of said coil spring immediately adjacent said notch.

5. In combination with the bat bar of a harvester reel wherein said bat-bar is bordered on its upper edge with a metal rod, a snap-locked but quick-detachable pick-up finger comprising an inverted, vertically elongated U-shaped clamping yoke straddling said bat-bar from above, said clamping yoke including opposed depending shanks connected at their upper ends by a half loop, such half loop straddling the metal rod, a transverse-axis coil spring on the lower end of one shank extending beneath the bat bar, a hook on the lower end of the opposite shank snap-engaged through said coil spring from one side thereof, and a spring tine depending from the end of the coil spring opposite said one shank.

6. A combination, as in claim 5, wherein said half loop has an inside diameter not greater than the outside diameter of the metal rod, and the shanks of said clamping yoke initially diverging downwardly whereby when said shanks relatively approach each other upon the hook being snap-locked with the coil spring, the half loop frictionally binds on said metal rod.

RALPH W. KEENE.

REFERENCES CITED

The following references are of record in the file of this patent:

UNITED STATES PATENTS

| Number | Name | Date |
|---|---|---|
| 41,740 | Drake | Feb. 23, 1864 |
| 319,631 | Sellars | June 9, 1885 |
| 1,996,294 | Hume | Apr. 2, 1936 |